J. Andrews.
Clothes Pole.
N° 96,183.  Patented Oct. 26, 1869.
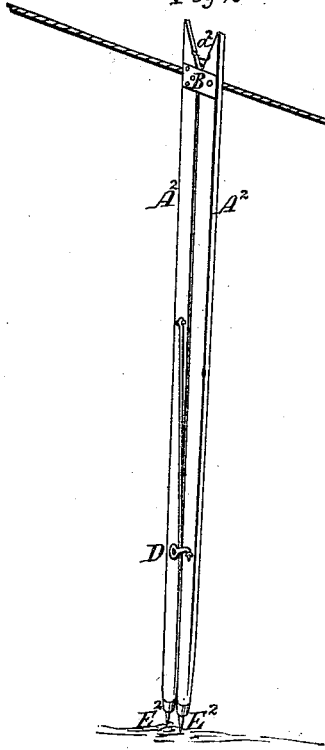
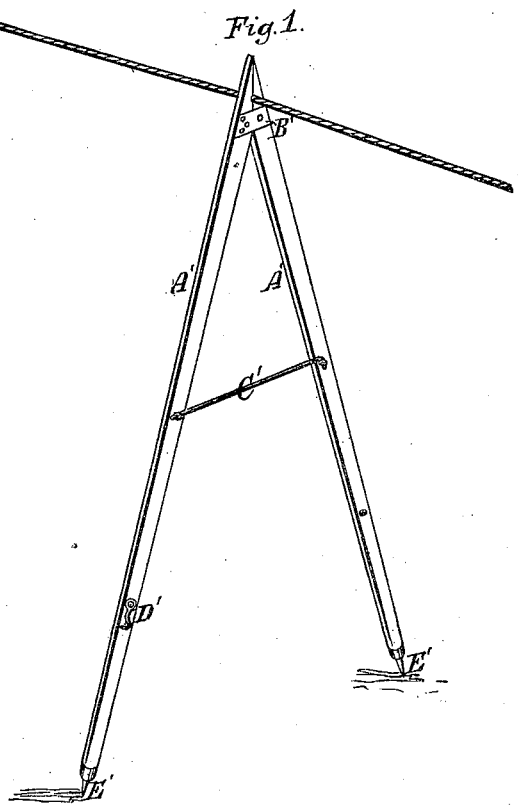
Witnesses.
Jno. Davis.
Th. E. M. White.
Inventor.
John Andreas

United States Patent Office.

JOHN ANDREWS, OF NEW BEDFORD, MASSACHUSETTS.

Letters Patent No. 96,183, dated October 26, 1869.

IMPROVED CLOTHES-LINE SUPPORTER.

The Schedule referred to in these Letters Patent and making part of the same.

*To all whom it may concern:*

Be it known that I, JOHN ANDREWS, of New Bedford, in the county of Bristol, and State of Massachusetts, have invented a new and improved Clothes-Line Supporter; and I do hereby declare that the following is a full and exact description thereof, reference being had to the accompanying drawing, and to the letters of reference marked thereon.

My invention consists in a triangular clothes-line supporter, with joint at the apex and brace.

To enable others skilled in the art to make and use my invention, I will proceed to describe its construction and operation.

Figure 1 is a perspective view of my invention as seen supporting a line.

Figure 2 represents it closed for transportation.

Fig. 1. $A^1 A^1$, legs; $B^1$, hinge; $C^1$, brace; $D^1$, hook; $E^1 E^1$, points.

Fig. 2. $A^2 A^2$, legs; $B^2$, hinge; $C^2$, brace; $D^2$, hook; $E^2 E^2$, points; $a^2$, dowel.

Operation.

The line being placed between the jaws, and resting on the dowel $a^2$, and the legs $A^1 A^1$ separated and secured by brace $C^1$, the top of the supporter will be firmly held by the pressure of the jaws on the line, and the feet prevented from slipping by the points $E^1 E^1$, as will be seen without further description.

When closed for transportation, the legs $A^2 A^2$ will be held together by hook $D^2$.

Claim.

What I claim as my invention, and desire to secure by Letters Patent, is—

The combination of legs $A^1$, points $E^1$, brace $C^1$, and hinge $B^1$, as herein described, for the purpose specified.

JOHN ANDREWS.

Witnesses:
 JNO. DAVIS,
 TH. E. M. WHITE.